United States Patent
Tango

(10) Patent No.: US 6,813,144 B2
(45) Date of Patent: Nov. 2, 2004

(54) APPARATUS WHERE MEDIA HAVING DIFFERENT CONFIGURATIONS ARE INSTALLED

(75) Inventor: Ken-ichiro Tango, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 39 days.

(21) Appl. No.: 10/337,759

(22) Filed: Jan. 7, 2003

(65) Prior Publication Data

US 2003/0222549 A1 Dec. 4, 2003

(30) Foreign Application Priority Data

May 28, 2002 (JP) .................................. 2002-153864

(51) Int. Cl.[7] .................................................. G06F 1/16
(52) U.S. Cl. ...................... 361/679; 211/41.12; 206/307
(58) Field of Search ................. 361/679, 684; 211/41.12; 206/307, 387.1, 387.14, 387.15

(56) References Cited

U.S. PATENT DOCUMENTS 6,019,230 A * 2/2000 Hayashi .................... 211/41.12
6,640,972 B2 * 11/2003 Morita .................. 206/387.14

FOREIGN PATENT DOCUMENTS

| JP | 7-98921 | 4/1995 |
| JP | 7-334965 | 12/1995 |
| JP | 8-7423 | 1/1996 |

* cited by examiner

Primary Examiner—Yean-Hsi Chang
(74) Attorney, Agent, or Firm—Greer, Burns & Crain Ltd.

(57) ABSTRACT

An apparatus where media are installed, that is detachably installed in a library apparatus, wherein a first medium and a second medium having a different configuration from the first medium are installed together, includes an installation error detecting mechanism wherein detecting an installation error of the first medium in the apparatus where media are installed and detecting an installation error of the second medium in the apparatus where media are installed are implemented together.

3 Claims, 9 Drawing Sheets

APPARATUS WHERE MEDIA HAVING DIFFERENT CONFIGURATIONS ARE INSTALLED

BACKGROUND OF THE INVENTION

1. Field of the Invention

The present invention generally relates to apparatuses where media are installed, and more particularly, to an apparatus having a compatible structure, namely an apparatus where media having different configurations are installed.

2. Description of the Related Art

There is a storage device, wherein a magnetic tape is used as a recording medium provided, as an outside storage device of a computer. Magnetic tape is disposed inside of a magnetic tape cartridge. At a time of writing or reading data, the magnetic tape is pulled out from the magnetic tape cartridge so that a process for writing or reading data is implemented.

Normally, a necessary number of the magnetic tape cartridges are installed in a magnetic tape library apparatus (hereinafter "library apparatus") so that the magnetic tape cartridge is loaded to a magnetic tape drive unit selectively. Because of this, the process for writing or reading data is implemented.

The library apparatus includes a cell unit, the magnetic tape drive unit and an accessor. The cell unit includes a plurality of cells where the magnetic tape cartridges are installed. The magnetic tape drive unit carries out the process for writing or reading data. The magnetic tape cartridge is carried between the cell unit and the magnetic tape drive unit by the accessor.

Furthermore, the library apparatus includes a cartridge access station (CAS). The magnetic tape cartridge is installed in or removed from the library apparatus by the CAS. The CAS has a cartridge installing unit and a cartridge removing unit. The magnetic tape cartridge is installed in or removed from the cartridge installing unit and the cartridge removing unit, respectively, by using the apparatus (hereinafter "magazine") where media are installed. That is, the magnetic tape cartridge is installed in the apparatus where media are installed so as to be installed by the cartridge installing unit of the CAS.

The apparatus where media are installed includes a plurality of racks where the magnetic tape cartridges are installed. The apparatus where media are installed also includes a grip for carrying so as to be capable of being carried. The library apparatus having the above mentioned structure has been used as a mass outside storage device for a computer recently.

Meanwhile, it is a general practice that a digital linear tape cartridge (DLT cartridge) is used as a medium for the above mentioned library apparatus, that is, the magnetic tape cartridge. Recently, a linear tape open cartridge (LTO cartridge) has been used as well as the DLT cartridge. The LTO cartridge has a larger storage capacity than the DLT cartridge. Since both the DLT cartridge and the LTO cartridge have their own respective characteristic advantages, both the DLT cartridge and the LTO cartridge have been used widely.

A related art apparatus where media are installed and a related art library apparatus have structures exclusive for the LTO cartridge or the DLT cartridge. However, the LTO cartridge and the DLT cartridge have substantially similar configurations. More particularly, the width of the DLT cartridge is only slightly wider than the LTO cartridge and the full length of the DLT cartridge is only slightly longer than the LTO cartridge. Because of this, a library apparatus and an apparatus where both the LTO cartridge and the DLT cartridge can be housed and installed, have been proposed.

However, the related art apparatus where media are installed has a structure exclusively for the LTO cartridge or the DLT cartridge. Accordingly, mechanisms for preventing the cartridge from being installed in error that are proper for the respective cartridges are respectively provided in the related art apparatuses where media are installed. Because of this, even if the related art apparatus is one where both the LTO cartridge and the DLT cartridge can be installed, it is not possible to detect a case where the respective cartridges are installed in error.

SUMMARY OF THE INVENTION

Accordingly, it is a general object of the present invention to provide a novel and useful apparatus where media are installed, in which one or more of the problems described above are eliminated.

Another and more specific object of the present invention is to provide an apparatus where a plurality of media having different configurations can be installed together and installations in error of the respective media can be detected.

The above objects of the present invention are achieved by an apparatus where media are installed, that is detachably installed in a library apparatus, wherein a first medium and a second medium having a different configuration from the first medium are installed together, including an installation error detecting mechanism wherein detecting an installation in error of the first medium in the apparatus where media are installed and detecting an installation error of the second medium in the apparatus where media are installed are implemented together.

Other objects, features, and advantages of the present invention will become more apparent from the following detailed description when read in conjunction with the accompanying drawings.

DETAILED DESCRIPTION OF THE PREFERRED EMBODIMENTS

A description will now be given, with reference to FIGS. 1 through 10, of embodiments of the present invention.

Figure 1:
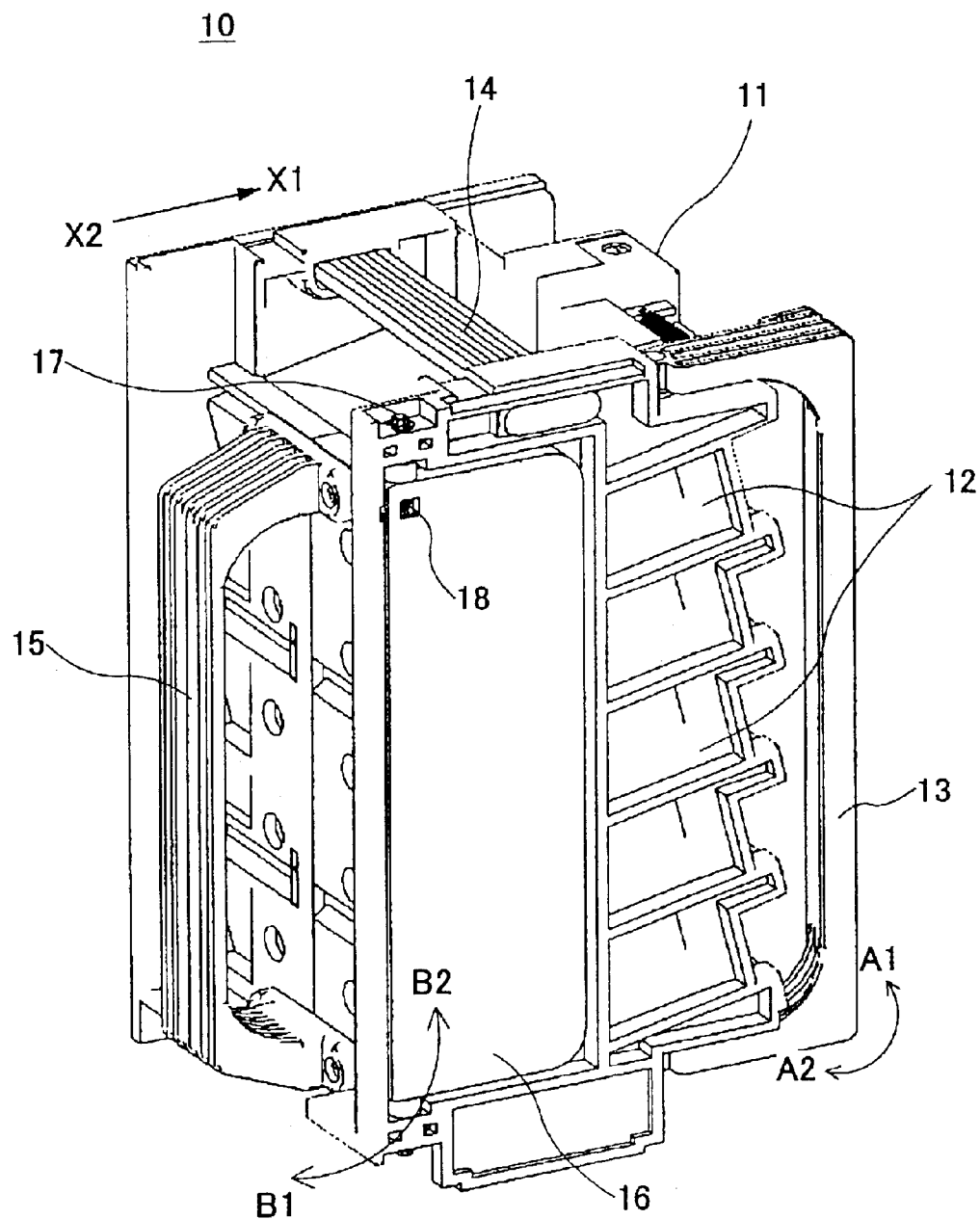
FIG. 1 is a perspective view of a magazine 10 as an apparatus where media are installed of an embodiment of the present invention.
Figure 2:
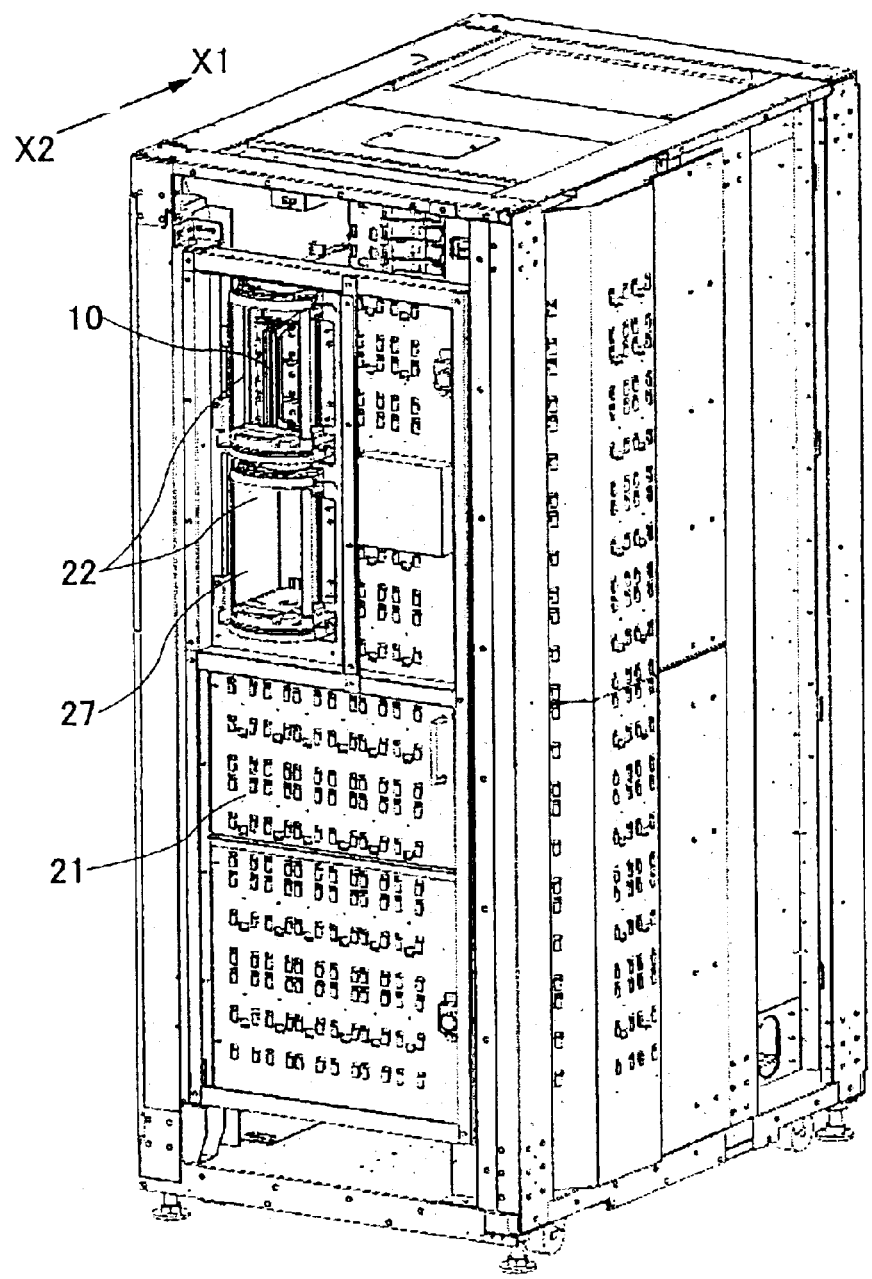
FIG. 2 is a perspective view of a magnetic tape library apparatus 20 where the magazine 10 is installed.

FIG. 1 is a perspective view of a magazine 10 as an apparatus where media are installed of an embodiment of the present invention. FIG. 2 is a perspective view of a magnetic tape library apparatus 20 (hereinafter "library apparatus 20") where the magazine 10 is installed.

Figure 3:
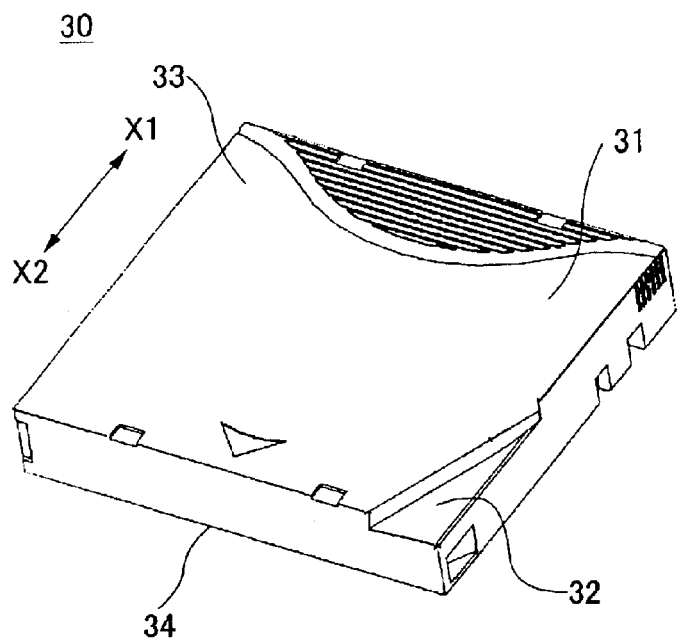
FIG. 3 is a perspective view of an LTO cartridge 30.
Figure 4:
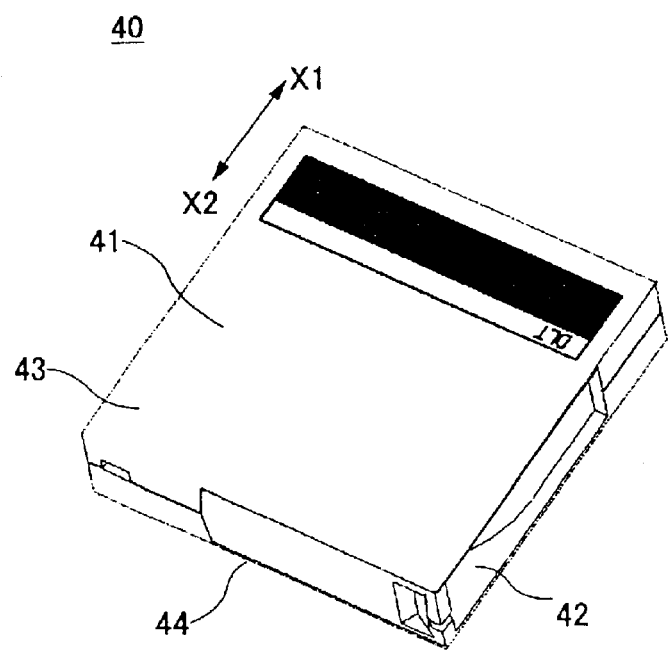
FIG. 4 is a perspective view of a DLT cartridge 40.

Referring to FIGS. 1 and 2, the magazine 10 and the library apparatus 20 have compatible structures wherein both a linear tape open cartridge (LTO cartridge) 30 shown in FIG. 3 and a digital linear tape cartridge (DLT cartridge) 40 shown in FIG. 4 can be installed together. Here, FIG. 2 shows a state wherein a decorative sheet provided at an outside of the library apparatus 20 is removed.

FIG. 3 is a perspective view of an LTO cartridge 30. FIG. 4 is a perspective view of a DLT cartridge 40. Reels not illustrated in FIGS. 1 and 2 are provided inside of the LTO cartridge 30 and the DLT cartridge 40. A magnetic tape winds about the reel. In the library apparatus 20 shown in FIG. 2, the magnetic tape is pulled out from or returned to the LTO cartridge 30 or the DLT cartridge 40 so that a magnetic write and read process against the magnetic tape is implemented.

As described above, the LTO cartridge 30 shown in FIG. 3 and the DLT cartridge 40 shown in FIG. 4 have substantially similar configurations. More particularly, the DLT cartridge 40 is only slightly wider than the LTO cartridge 30 and the DLT cartridge 40 is only slightly longer than the LTO cartridge 30.

The LTO cartridge 30 has an LTO cartridge body part 31 where an LTO side hollow part 32 is formed. The LTO side hollow part 32 is formed at a corner of the upper surface 33 of the LTO cartridge body part 31. Thus, since the LTO side hollow part 32 is formed at only one specific part of the LTO cartridge body part 31, it is possible to detect an installation error of the LTO cartridge 30 by using the LTO side hollow part 32. That is, the LTO side hollow part 32 functions as an installation error discrimination part.

The DLT cartridge 40 has an DLT cartridge body part 41 where a DLT side hollow part 42 is formed. The DLT side hollow part 42 is formed at only one part of a side surface of the DLT cartridge body part 41. Thus, since the DLT side hollow part 42 is formed at only one specific part of the DLT cartridge body part 41, it is possible to detect an installation error of the DLT cartridge 40 by using the DLT side hollow part 42. That is, the DLT side hollow part 42 functions as an installation error discrimination part.

The LTO side hollow part 32 is formed on the LTO cartridge body part 31 at a similar position to the position on the DLT cartridge body part 41 where the DLT side hollow part 42 is formed.

Because of this, in a case where the LTO cartridge 30 and the DLT cartridge 40 are installed properly in a rack part 12 (illustrated in FIG. 1) of the magazine 10 that is a portion allowing the LTO cartridge 30 and the DLT cartridge 40 to be installed, the DLT side hollow part 32 and the LTO side hollow part 42 are positioned at the substantially same position of the rack part 12.

Therefore, an area in the rack part 12 where the LTO side hollow part 32 is positioned in a case where the LTO cartridge 30 is installed in the rack part 12 properly and an area in the rack part 12 where the DLT side hollow part 42 is positioned in a case where the DLT cartridge 40 is installed in the rack part 12 properly, are partially superimposed. This partially superimposed area is defined as an installation error detecting common area.

Next, the library apparatus 20 where the magazine 10 is installed will be described with reference to FIG. 2.

A cell unit, a magnetic tape drive unit and an accessor (not illustrated in FIG. 2) are provided in a body part 21 of the library apparatus 20. The cell unit includes a plurality of cells where the LTO cartridge 30 and the DLT cartridge 40 are installed. The magnetic tape drive unit carries out the process for writing or reading data. The LTO cartridge 30 and the DLT cartridge 40 are carried between the cell unit and the magnetic tape drive unit by the accessor.

The library apparatus 29 includes a cartridge access station (CAS) 22. The LTO cartridge 30 and the DLT cartridge 40 are installed in or removed from the body part 21 by the CAS 22. Two of the CASs 22 are provided at the upper and lower sides of the body part 21.

Figure 7:
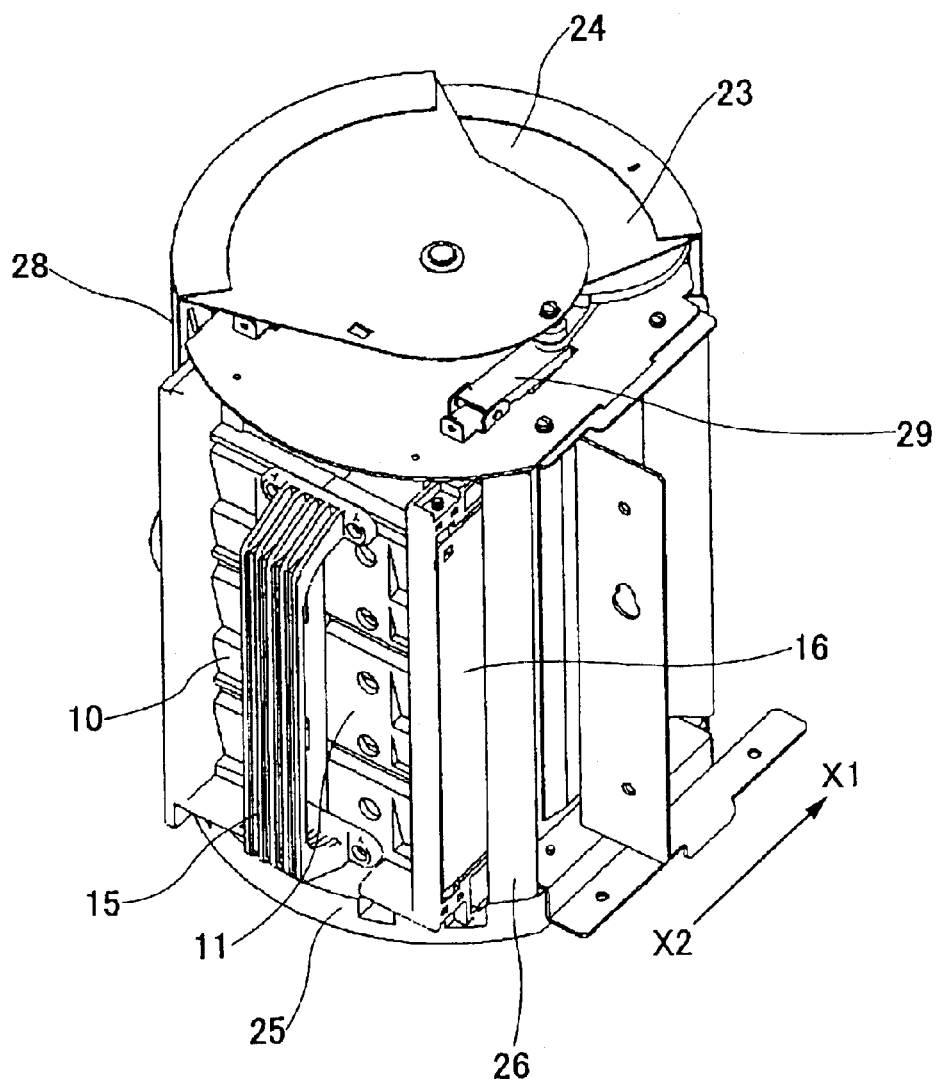
FIG. 7 is a view showing a state where the magazine 10, wherein the cartridge is installed properly, is installed in a cartridge access station (CAS) 22.
Figure 8:
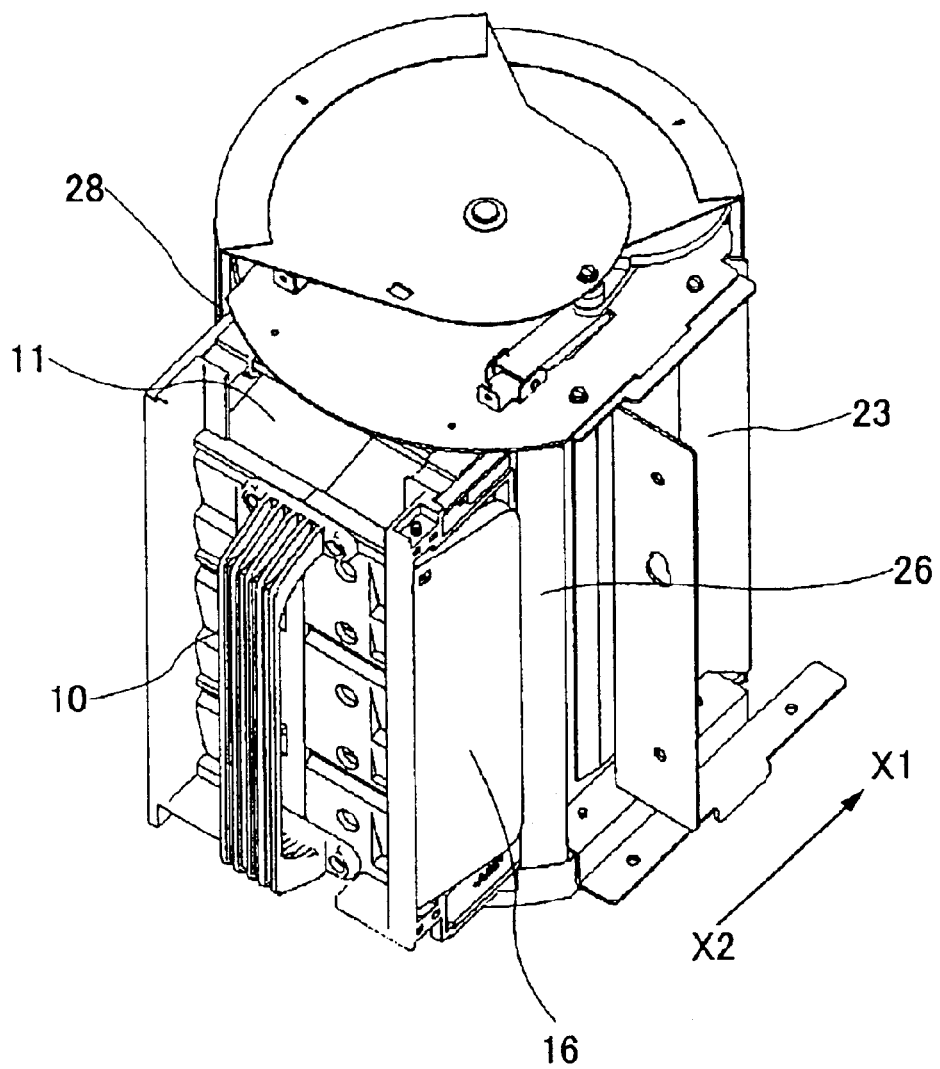
FIG. 8 is a view showing a state where the magazine 10, wherein the cartridge is installed in error, is installed in the CAS 22.

FIG. 7 is a view showing a state where the magazine 10, wherein the cartridge is installed properly, is installed in the CAS 22. FIG. 8 is a view showing a state where the magazine 10, wherein the cartridge is installed in error, is installed in the CAS 22.

Referring to FIGS. 7 and 8, the CAS 22 includes a CAS housing 23, a shutter 28, and others. The CAS housing 23 having a substantially cylindrical configuration has a structure wherein a frame 26 is provided between an upper part plate 24 and a lower part plate 25.

Referring to FIGS. 2, 7, and 8, the CAS housing has an installation opening part 27 piercing the CAS housing 23 in directions of X1 and X2 illustrated by arrows in FIGS. 7 and 8. The magazine 10 is inserted through the installation opening part 27 in the direction of X1 so as to be installed in the CAS 22. In addition, the magazine 10 is pulled out from the installation opening part 27 in the direction of X2 so as to be removed from the CAS 22.

The shutter 28 functions for opening and closing the installation opening part 27. The shutter 28 is opened and closed by means of a shutter opening and closing mechanism 29 provided on the upper part plate 24. In a case where the magazine 10 is not installed in the library apparatus 20, the shutter 28 closes the installation opening part 27 so that dust is prevented from invading the library apparatus 20 and something other than the magazine 10 is prevented from being installed in error.

Next, the magazine 10 will be described with reference to FIG. 1.

The magazine 10 includes a magazine body part 11 and a plate 16 for preventing installation in error. As described above, the magazine 10 is used for installing the LTO cartridge 30 and the DLT cartridge 40 in the library apparatus 20.

A plurality (five pieces in this embodiment) of the rack parts 12 are formed in the magazine body part 11. The rack part 12 has a structure where both the LTO cartridge 30 and the DLT cartridge 40 can be installed.

The rack part 12 also has a structure so that the rack part 12 can be carried manually. The magazine body part 11 has a grip 14 for carrying and a grip 15 for carrying in a case where the magazine 10 is carried manually. The grip 14 for carrying is used for carrying the magazine 10 mainly and provided at an upper part of the magazine body part 11. The grip 15 for carrying is used for installing the magazine 10 in or removing the magazine 10 from the CAS 22 and provided at a side part of the magazine body part 11.

The magazine body part 11 has an arm 13 for preventing a cartridge from falling out. The LTO cartridge 30 and the DLT cartridge 40 are prevented from breaking out from the rack part 12 by the arm 13 for preventing a cartridge from falling out. Because of this, the arm 13 can move relative to the magazine body part 11 in directions illustrated by arrows A1 and A2 in FIG. 1.

As shown in FIG. 1, the rack part 12 is tilted at an angle. Therefore, the LTO cartridge 30 and the DLT cartridge 40 are prevented from breaking out from the rack part 12 by the above mentioned configuration of the rack part 12. However, in a case where the magazine 10 is carried manually and the library apparatus 20 has a mechanism for prevention of breaking out based on only the tiled configuration of the rack part 12, there is likelihood that the LTO cartridge 30 and the DLT cartridge 40 will fall out from the magazine 10. Because of this, in this embodiment, the arm 13 for prevention of breaking out is provided. That is, after the LTO cartridge 30 and the DLT cartridge 40 are installed in the magazine 10, the arm 13 for prevention of breaking out is rotated in the arrow A1 direction illustrated in FIG. 1 so that the arm 13 for prevention of breaking out faces the LTO cartridge 30 and the DLT cartridge 40 installed in the magazine 10. As a result of this, the LTO cartridge 30 and the DLT cartridge 40 are prevented from breaking out from the magazine 10.

The plate 16 for preventing installation error is provided at a side surface of the magazine body part 11. The plate 16 for preventing installation error can be rotated about a shaft 17 fixed to the magazine body part 11 in arrow directions of B1 and B2 illustrated in FIG. 1.

A coil spring 18 is provided at the shaft 17. The coil spring 18 exerts a force on the plate 16 for preventing installation error in the arrow direction of B2 illustrated in FIG. 1. Because of this, in the cases where the LTO cartridge 30 and the DLT cartridge 40 are not installed in the magazine 10 and the LTO cartridge 30 and the DLT cartridge 40 are properly installed in the magazine 10, the plate 16 for preventing installation error is rotated in the arrow direction of B2 illustrated in FIG. 1.

Referring to FIGS. 5, 6, 9, and 10, an installation error detecting projection part 19 is formed inside of the plate 16 for preventing installation error, as an engaging projection part. The installation error detecting projection part 19 projects to the inside of the rack part 12 through an opening part 50 formed on the magazine body part 11 in a state where the LTO cartridge 30 and the DLT cartridge 40 are not installed in the magazine 10. Furthermore, the installation error detecting projection part 19 is formed at the above described installation error detecting common area of the rack part 12.

Here, as describe above, the installation error detecting common area is defined as the partially superimposed area containing both the area in the rack part 12 where the LTO side hollow part 32 is positioned when the LTO cartridge 30 is installed in the rack part 12 properly and the area in the rack part 12 where the DLT side hollow part 42 is positioned when the DLT cartridge 40 is installed in the rack part 12 properly. The LTO side hollow part 32 is formed at only one specific part of the LTO cartridge 30. The DLT side hollow part 42 is formed at only one specific part of the DLT cartridge 40.

Figure 5:
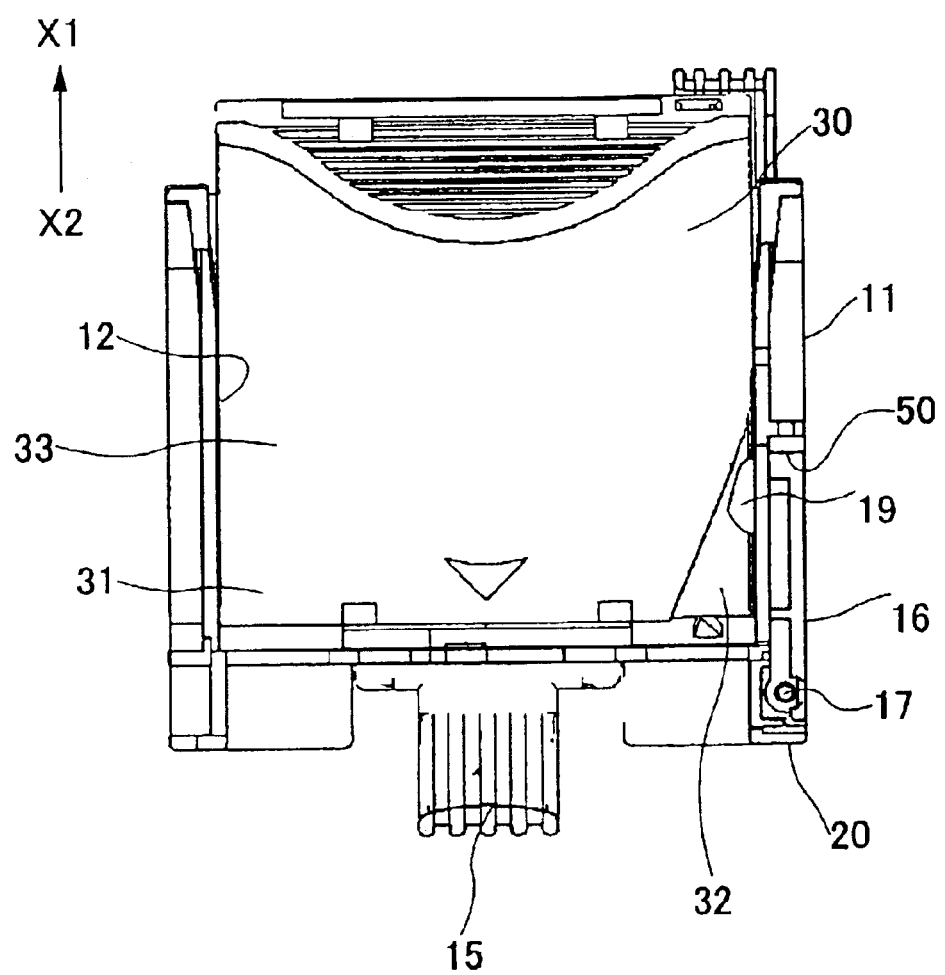
FIG. 5 is a view for explaining a state where the LTO cartridge 30 is installed in the magazine 10 properly.
Figure 6:
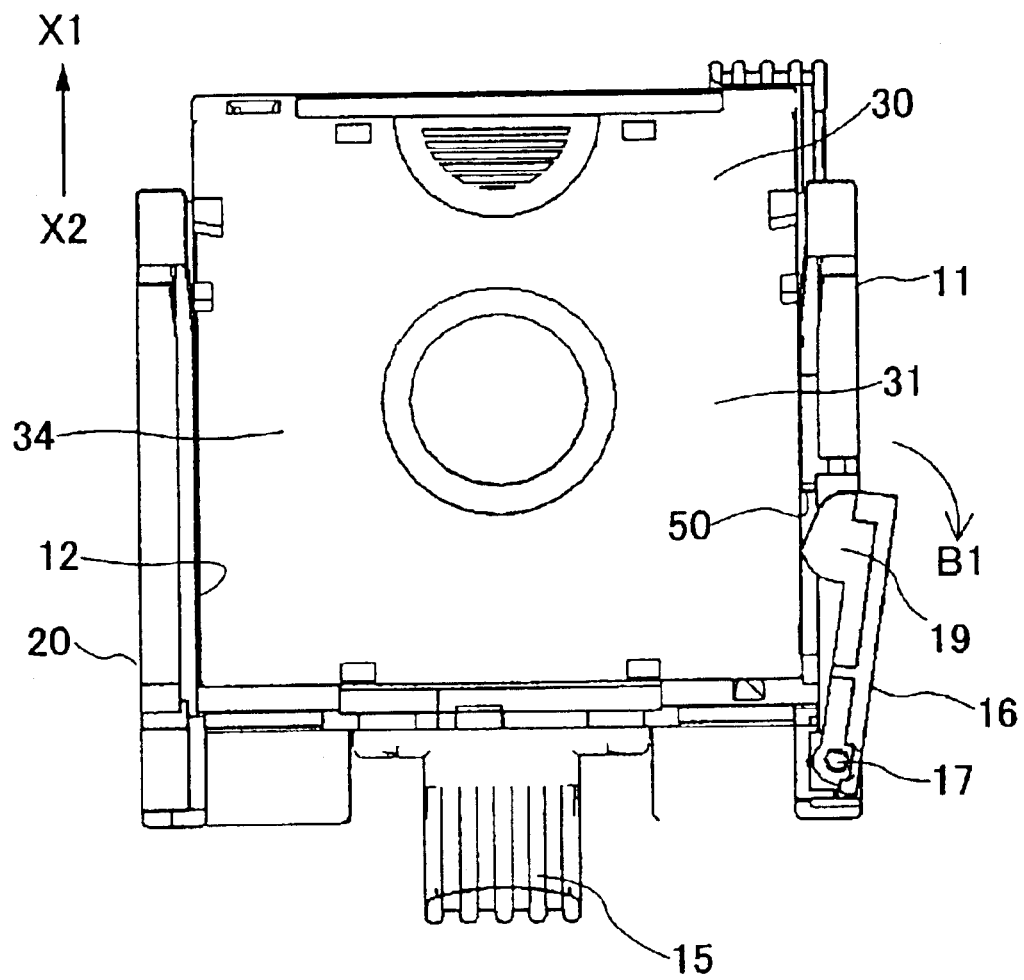
FIG. 6 is a view for explaining a state where the LTO cartridge 30 is installed in the magazine 10 in error.

FIG. 5 is a view for explaining a state where the LTO cartridge 30 is installed in the magazine 10 properly. FIG. 6 is a view for explaining a state where the LTO cartridge 30 is installed in the magazine 10 in error.

As shown in FIG. 5, in a case where the LTO cartridge 30 is installed in the rack part 12 properly, the installation error detecting projection part 19 engages the LTO side hollow part 32. Hence, in this case, a state, where the plate 16 for preventing installation error is rotated in the arrow B2 direction, is maintained.

As shown in FIG. 6, a lower surface 34 is positioned at a side where the upper surface 33 should be positioned so that the LTO cartridge 30 is inserted in the rack part 12 in error, therefore the installation error detecting projection part 19 does not engage the LTO side hollow part 32. Rather, the installation error detecting projection part 19 comes in contact with a portion of the LTO cartridge body part 31 other than the LTO side hollow part 32. Hence, in this case, the plate 16 for preventing installation error is rotated in the arrow B1 direction so that the plate 16 for preventing installation error projects from a side surface of the magazine body part 11.

The DLT side hollow part 42 has a structure similar to the LTO side hollow part 32. That is, the DLT side hollow part 42 is formed at only one specific part of the DLT cartridge 40.

Figure 9:
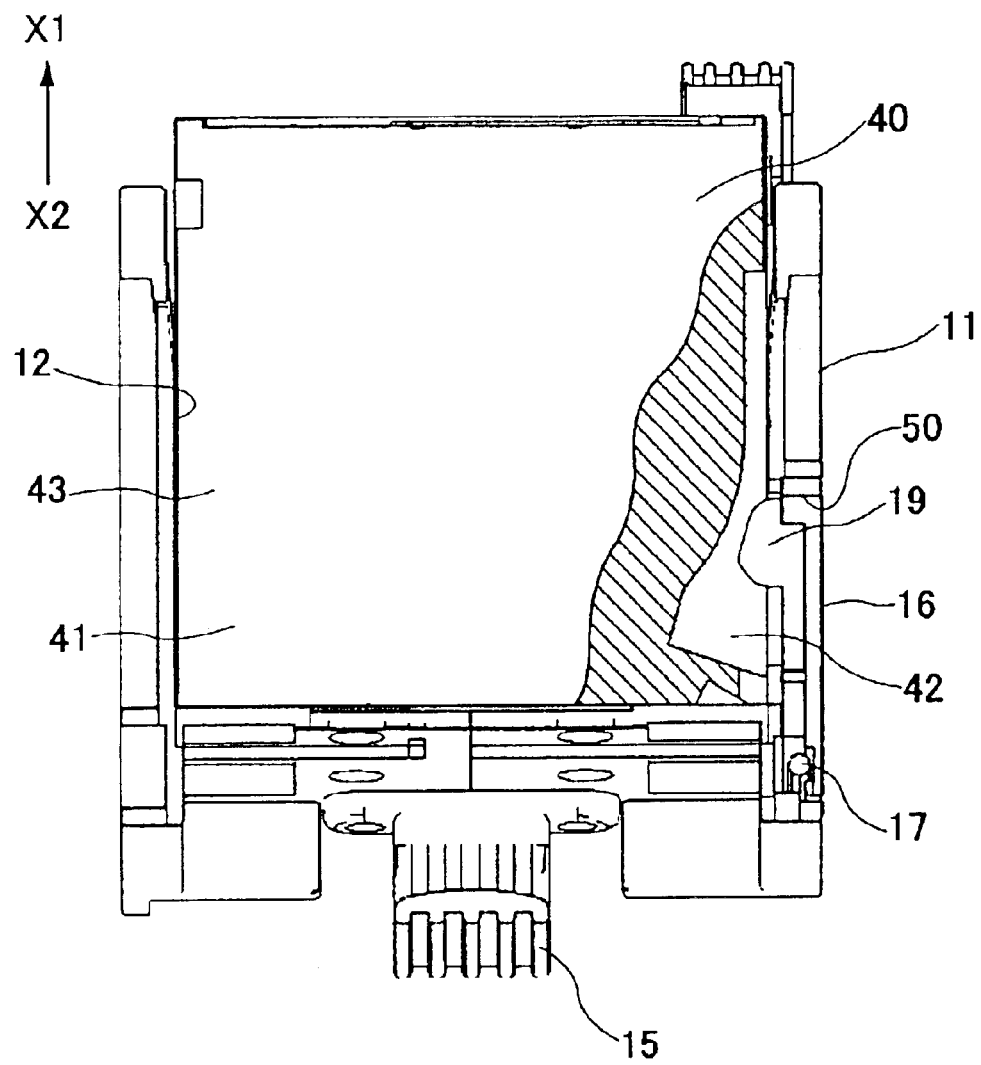
FIG. 9 is a view for explaining a state where the DLT cartridge 40 is installed in the magazine 10 properly.
Figure 10:
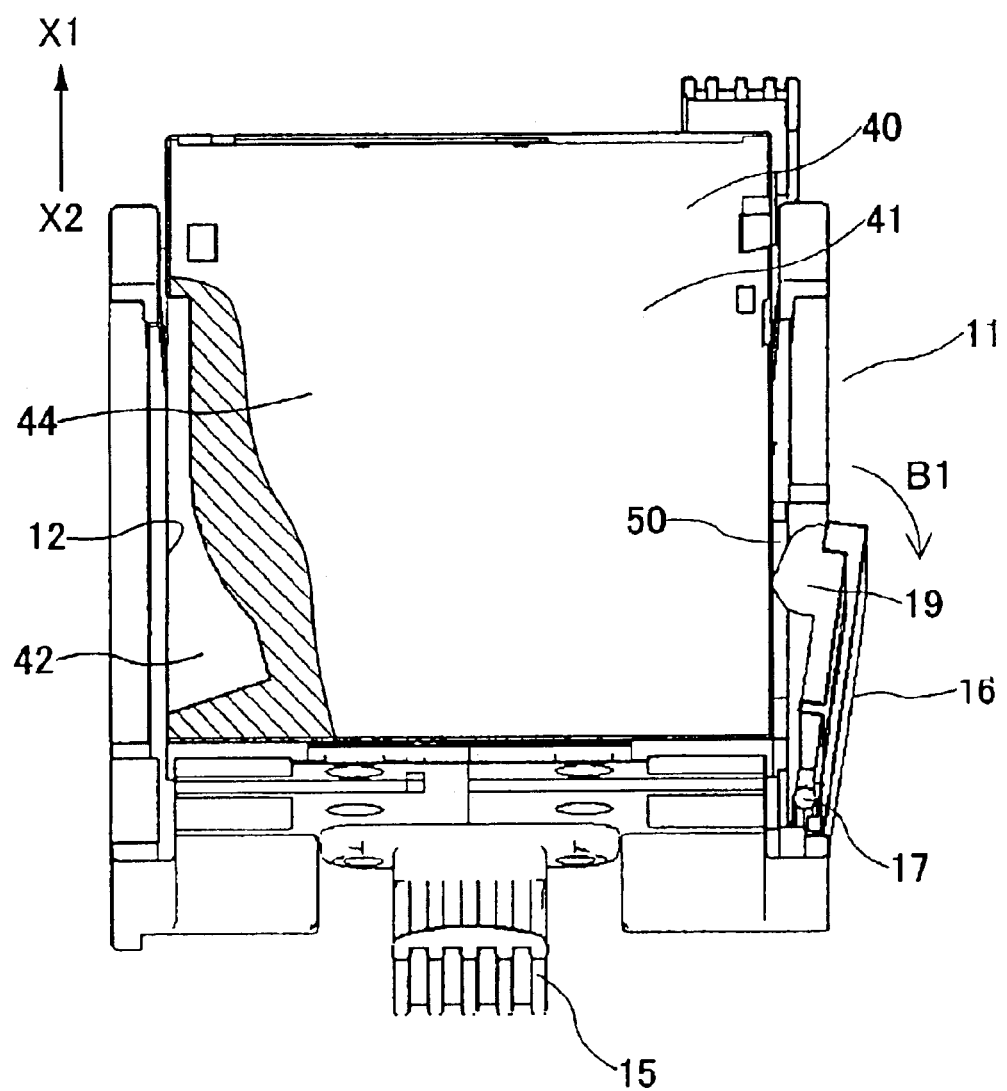
FIG. 10 is a view for explaining a state where the DLT cartridge 40 is installed in the magazine 10 in error.

FIG. 9 is a view for explaining a state where the DLT cartridge 40 is installed in the magazine 10 properly. FIG. 10 is a view for explaining a state where the DLT cartridge 40 is installed in the magazine 10 in error.

As shown in FIG. 9, in a case where the DLT cartridge 40 is installed in the rack part 12 properly, the installation error detecting projection part 19 engages the DLT side hollow part 42. Hence, in this case, a state, where the plate 16 for preventing installation error is rotated in the arrow B2 direction, is maintained.

As shown in FIG. 10, the lower surface 44 is positioned at a side where the upper surface 43 should be positioned so that the DLT cartridge 40 is inserted in the rack part 12 in error, therefore the installation error detecting projection part 19 does not engage the DLT side hollow part 42. Rather, the installation error detecting projection part 19 comes in contact with a portion of the DLT cartridge body part 41 other than the DLT side hollow part 42.

Hence, in this case, the plate 16 for preventing installation error is rotated in the arrow B1 direction so that the plate 16 for preventing installation error projects from a side surface of the magazine body part 11.

Accordingly, in a case where the LTO cartridge 30 and the DLT cartridge 40 are inserted to the rack part 12 of the magazine 10 properly, as shown in FIGS. 5 and 9 respectively, a state, where the plate 16 for preventing installation error is rotated in the arrow B2 direction, is maintained. Hence, the plate 16 for preventing installation error is not forced out from the magazine body part 11 but positioned at an installation allowance position. Because of this, as shown in FIG. 7, the magazine 10 can be installed inside of the CAS 22 smoothly.

On the other hand, in a case where at least one of the LTO cartridge 30 and the DLT cartridge 40 is installed in the rack part 12 of the magazine 10 in error, as shown in FIGS. 6 and 10, the plate 16 for preventing installation error is rotated in the arrow B1 direction. Hence, the plate 16 for preventing installation error is forced out from the magazine body part 11 so as to be positioned at an installation obstruction position. Because of this, as shown in FIG. 8, the plate 16 for preventing installation error collides with the frame 26 so that the magazine 10 is prevented from being installed to the CAS 22.

Thus, the LTO cartridge 30 and the DLT cartridge 40 are prevented from being installed in the library apparatus 20 in error. Accordingly, the library apparatus 20, the LTO cartridge 30, and the DLT cartridge 40 are surely prevented from being damaged.

Furthermore, in the above mentioned structure, it is possible to easily and surely detect an installation error by engaging the LTO side hollow part 32 and the DLT side hollow part 42 having different configurations with the one installation error detecting projection part 19 formed inside of the plate 16 for preventing installation error. Because of this, providing separate error detecting mechanisms for the LTO cartridge 30 and the DLT cartridge 40 can be avoided. Hence, it is possible to make the size of the magazine 10 small and reduce the manufacturing cost for the magazine 10.

The present invention is not limited to these embodiments, but variations and modifications may be made without departing from the scope of the present invention.

For example, the LTO cartridge 30 and the DLT cartridge 40 are used as media in the above mentioned embodiment. However, the present invention is not limited to these tape cartridges.

Rather, the present invention can be applied to various kinds of electronic devices or media that are installed compatibly. This patent application is based on Japanese priority patent application No. 2002-153864 filed on May 28, 2002, the entire contents of which are hereby incorporated by reference.

What is claimed is:

1. An apparatus where media are installed, that is detachably installed in a library apparatus, wherein a first medium and a second medium having a different configuration from the first medium are installed together, comprising:

an installation error detecting mechanism wherein detecting an installation in error of the first medium in the apparatus where media are installed and detecting an installation error of the second medium in the apparatus where media are installed are implemented together;

wherein an installation error discrimination part is formed for each of the first medium and the second medium, respectively, and the installation error detecting mechanism detects installations in error of the first medium and the second medium in the apparatus where media are installed by detecting the installation error discrimination parts of the first medium and the second medium, the installation error discrimination parts of the first medium and the second medium include side hollow-forming parts formed in the first medium and the second medium, and the installation error detecting mechanism includes an engaging projection part engaging the installation error discrimination parts of the first medium and the second medium in a case where the first medium and the second medium are properly installed in the apparatus where media are installed;

the apparatus further comprising a rack part where the first medium and the second medium are installed, wherein an installation error detecting common area is situated inside the rack part, and the installation error detecting common area is defined as a partially superimposed area continuing both an area where the side hollow-forming part of the first medium is positioned when the first medium is installed in the rack part properly and an area where the side hollow-forming part of the second medium is positioned when the second medium is installed in the rack part properly, and the engaging projection part is formed in the installation error detecting common area;

further wherein in a case where the first medium or the second medium is installed in the rack part in error, the engaging projection part does not engage with the side hollow-forming part of the first medium or the side hollow-forming part of the second medium but comes in contact with a portion of the first medium other than the side hollow part or a portion of the second medium other than the side hollow part, respectively; and the installation error detecting mechanism further includes a plate for preventing installation error that moves together with the engaging projection part, wherein in a case where the engaging projection part engages the installation error discrimination part of the first medium or the second medium, the plate for preventing installation error is positioned at an installation allowance position so that the apparatus where media are installed is allowed to be installed in the library apparatus, and in a case where the engaging projection part does not engage the installation error discrimination part of the first medium or the second medium, the plate for preventing installation error is positioned at an installation obstruction position where the apparatus where media are installed is obstructed from being installed in the library apparatus.

2. The apparatus where media are installed as claimed in 1, wherein the plate for preventing installation error is rotatably provided attached to the apparatus where media are installed.

3. The apparatus where media are installed as claimed in claim 1, wherein the first medium is a digital linear tape cartridge and the second medium is a linear tape open cartridge.

* * * * *